(12) United States Patent
Grothe et al.

(10) Patent No.: US 9,080,888 B2
(45) Date of Patent: Jul. 14, 2015

(54) TECHNIQUE FOR GENERATING FROM POINT DATA GEOMETRIC DATA THAT CONTINUOUSLY DESCRIBE A COURSE OF A GEOGRAPHIC OBJECT

(71) Applicant: Elektrobit Automotive GmbH, Erlangen (DE)

(72) Inventors: Carsten Grothe, Nuremberg (DE); Sandra Stecher, Erlangen (DE); Thomas Labella, Nuremberg (DE)

(73) Assignee: Elektrobit Automotive GmbH (DE)

( * ) Notice: Subject to any disclaimer, the term of this patent is extended or adjusted under 35 U.S.C. 154(b) by 63 days.

(21) Appl. No.: 13/866,062

(22) Filed: Apr. 19, 2013

(65) Prior Publication Data
US 2014/0149014 A1    May 29, 2014

(30) Foreign Application Priority Data

Apr. 19, 2012  (EP) .................................... 12002753

(51) Int. Cl.
*G01C 21/32* (2006.01)
(52) U.S. Cl.
CPC ..................................... *G01C 21/32* (2013.01)
(58) Field of Classification Search
CPC ...................................................... G01C 21/32
USPC ........ 701/93, 202, 213, 208, 200, 400; 703/2; 345/442
See application file for complete search history.

(56) References Cited

U.S. PATENT DOCUMENTS

| 7,089,162 B2 * | 8/2006 | Nagel ................................ 703/2 |
| 7,152,022 B1 * | 12/2006 | Joshi ................................ 703/2 |
| 7,522,091 B2 * | 4/2009 | Cong et al. ....................... 342/70 |
| 7,555,385 B2 * | 6/2009 | Niwa et al. ..................... 701/448 |
| 7,626,533 B2 * | 12/2009 | Cong et al. ....................... 342/70 |
| 7,912,879 B2 * | 3/2011 | Witmer ......................... 707/831 |
| 2005/0004753 A1 * | 1/2005 | Weiland et al. ............... 701/208 |
| 2005/0187705 A1 * | 8/2005 | Niwa et al. ..................... 701/208 |
| 2008/0170074 A1 | 7/2008 | Beier |
| 2009/0018767 A1 | 1/2009 | Gehring et al. |
| 2009/0144030 A1 | 6/2009 | Witmer |
| 2011/0125811 A1 * | 5/2011 | Witmer ......................... 707/812 |

FOREIGN PATENT DOCUMENTS

| DE | 101 14 412 C1 | 11/2002 |
| DE | 10 2005 024 558 A1 | 11/2006 |

* cited by examiner

*Primary Examiner* — Mary Cheung
*Assistant Examiner* — Michael Berns
(74) *Attorney, Agent, or Firm* — Carter, DeLuca, Farrell & Schmidt, LLP

(57) ABSTRACT

A technique for generating from a point set geometric data that continuously describe a course of a geographic object used in the context of generating data for a navigation device or driver assisted system is disclosed. The technique includes determining, from sub-sets of two or more road points, a sequence of primary base elements; determining an interconnecting secondary base element for adjacent primary base elements, that continuously connects to and at a connection point has the same gradient as each of the interconnected primary base elements; determining an interconnecting transition curve for adjacent primary and secondary base elements, that continuously connects to and at a connection point has the same gradient and the same curvature as each of the interconnected primary and secondary base elements; and determining geometric data that continuously describe a course of the geographic object from primary base elements, secondary base elements and transition curves.

14 Claims, 14 Drawing Sheets

TECHNIQUE FOR GENERATING FROM POINT DATA GEOMETRIC DATA THAT CONTINUOUSLY DESCRIBE A COURSE OF A GEOGRAPHIC OBJECT

TECHNICAL FIELD

The present disclosure generally relates to the processing of point data indicative of a course of an extended geographic object such as a road. Specifically, a technique for generating from such point data geometric data that continuously describe a course of the geographic object is described. The technique presented herein may be implemented as a method, apparatus or computer program product.

BACKGROUND

Modern navigation systems and other systems such as an Advanced Driver Assistance System (ADAS) rely on map data. Map data typically comprise point data indicative of geographic coordinates of certain geographic objects such as roads, railway lines, street addresses, rivers and special points of interest (such as hotels, restaurants and gas stations). For roads and other extended geographic objects discontinuous point data are not always a suitable base for the implementation of required processing or display functions. It has thus been proposed to represent the course of an extended geometric object by a continuous sequence of linear geometric elements such as circular arcs, line segments and clothoids.

DE 101 14 412 C1 teaches a technique for converting road points into a sequence of clothoids that describe a continuous course of a road. DE 10 2005 024 558 A1 describes an approach for deciding for a set of two adjacent road points whether to select a line, a circular arc or a clothoid as the geometric element for locally describing the course of the road between these two road points. The information about the individual geometric elements thus determined is used for calculating a maximum vehicle speed per geometric element.

SUMMARY

There is a need for a mathematically robust and fast technique for generating from a set of point data geometric data that continuously describe a course of a geographic object.

According to a first aspect, a method of generating from a point set geometric data that continuously describe a course of a geographic object is provided, wherein the method comprises determining, from sub-sets of two or more points, a sequence of two or more primary base elements, determining, for adjacent primary base elements, an interconnecting secondary base element that continuously connects to and at a connection point has the same gradient as each of the interconnected primary base elements, determining, for adjacent primary and secondary base elements, an interconnecting transition curve that continuously connects to and at a connection point has the same gradient and the same curvature as each of the interconnected primary and secondary base elements, and determining geometric data that continuously describe a course of the geographic object from the primary base elements, the secondary base element and the transition curve.

The geographic object may be an extended geographic object described by two or more points. As an example, the geographic object may be a road, a railway line, a river, and so on. The points describing the geographic object may be provided in the form of geographic coordinates (e.g., as map data).

The step of determining the interconnecting transition curve may comprise manipulating at least one of the adjacent primary and secondary base elements so as to realize a positional offset between the adjacent primary and secondary base elements at their connection point. The positional offset thus realized may be bridged by the interconnecting transition curve. The positional offset may be bridged in such a manner that the interconnecting transition curve continuously connects to and at a connection point has the same gradient and the same curvature as each of the interconnected primary and secondary base elements.

The manipulating step may be performed in various ways. As an example, at least one of the adjacent primary and secondary base elements may be manipulated by the impression of a shift. The shift may be realized by a translatory movement. Additionally, or as an alternative, at least one of the adjacent primary and secondary base elements may be rotated so as to realize the positional offset. As a further alternative, or in addition, a radius of at least one of the adjacent primary and secondary base elements may be varied.

The positional offset may be defined by at least one of a selected length of the transition curve, a length of the associated primary base element and a length of the associated secondary base element. As an example, a certain length of the transition curve may be selected in a first step and the positional offset may then be chosen such that the transition curve interconnecting the adjacent primary and secondary base elements can assume the selected length. The length of the transition curve may be selected statically or dynamically.

In one implementation the length of the transition curve is dynamically selected dependent on a length of at least one of the interconnected primary and secondary base elements. In other implementations the length of the transition curve may be defined by a selected positional offset. Both implementations may be combined, for example by defining a maximum positional offset and selecting the length of the transition curve with the constraint that the maximum positional offset should not be exceeded.

The transition curve may be selected from a transition curve set comprising a clothoid, a sine wave and a parabola, including any approximations thereof. Moreover, the primary and secondary base elements may be selected from a base element set comprising a line, a line segment, a circle and a circular arc, including any approximations thereof. As will be appreciated, a line segment may, for example, be approximated by a circular arc having a very large radius. In a similar manner, a circular arc may be approximated by a clothoid segment having an almost constant curvature, and so on.

The primary base elements may be determined in various ways. As an example, determining the primary base elements may comprise interpolating the individual sub-sets of points. It should be noted that the size of an individual sub-set of points for determining an individual base element may statically be configured or may dynamically be determined. The interpolation process may comprise a least-square or any other metric-based process. The kind of primary base elements to be used may statically be configured (e.g., such that always circles or circular arcs are used) or may dynamically be selected. In a similar manner, also the kind of the secondary base elements interconnecting adjacent primary base elements may either statically be configured or dynamically be selected.

The step of determining a primary base element may further comprise defining a corridor around an individual sub-set of points. The corridor may have a predefined width (of, e.g., 0.25 m to 3 m). Moreover, the corridor may, for example, be utilized in connection with dynamically determining a number of points from which an individual primary base element will be determined.

The secondary base element interconnecting adjacent primary base elements may also be determined in numerous ways. As an example, determining the interconnecting secondary base element may comprise determining a point of intersection between the adjacent primary base elements. If such a point of intersection can be determined, the interconnecting secondary base element may be calculated based on the point of intersection thus determined.

Also provided is a computer program product comprising program code portions for performing the steps of any method or method aspect presented herein when the computer program product is executed on a computing device (i.e., on a processor or a processor set). The computer program product may be stored on a computer readable recording medium, such as a hard disk, CD-ROM, DVD or semiconductor memory. Moreover, the computer program product may be provided for download via a network such as the Internet.

Still further, a database with geometric data that continuously describe a course of a geographic object is provided, wherein the geometric data in the database have been generated in accordance with the method presented herein. The database may belong to an ADAS and may thus be installed on a vehicle. Alternatively, the database may be installed in or may be accessible by a navigation device. The navigation device may be portable or of the built-in type.

Also provided is an apparatus for generating from a point set geometric data that continuously describe a course of a geographic object. The apparatus comprises a processor configured to determine, from sub-sets of two or more points, a sequence of primary base elements, to determine, for adjacent primary base elements, an interconnecting secondary base element that continuously connects to and at a connecting point has the same gradient as each of the interconnected primary base elements, to determine, for adjacent primary and secondary base elements, an interconnecting transition curve that continuously connects to and at a connection point has the same gradient and the same curvature as each of the interconnected primary and secondary base elements, and to determine geometric data that continuously describe a course of the geographic object from the primary base elements, the secondary base element and the transition curve.

The apparatus may further comprise or have access to a database with point data for the purpose of determining the sequence of primary base elements by the processor. The point data may take the form of geographic coordinates (e.g., as acquired using mobile mapping and/or satellite-based systems such as the Global Positioning System, GPS, or the Galileo system).

BRIEF DESCRIPTION OF THE DRAWINGS

Further aspects, details and advantages of the present disclosure will become apparent from the following description of exemplary embodiments in conjunction with the exemplary drawings, wherein.

DETAILED DESCRIPTION

In the following description of exemplary embodiments, for purposes of explanation and not limitation, specific details are set forth, such as specific processing steps and their visualization, to provide a thorough understanding of the present disclosure. It will be apparent to one skilled in the art that the technique presented herein may be practised in other embodiments that depart from these specific details. For example, while the following embodiments will primarily be described for point data that discontinuously describe the course of a road, it will be apparent that the technique presented herein could also be implemented in connection with point data of other extended geographic objects such as railway lines or rivers.

Moreover, those skilled in the art will appreciate that the methods, steps and functions discussed herein may be implemented using individual hardware circuitry, using software functioning in conjunction with a programmed processor or general purpose computer, using one or more Application Specific Integrated Circuits (ASICs), one or more Digital Signal Processors (DSPs) and/or one or more Field Programmable Gate Arrays (FPGAs).

Figure 1:
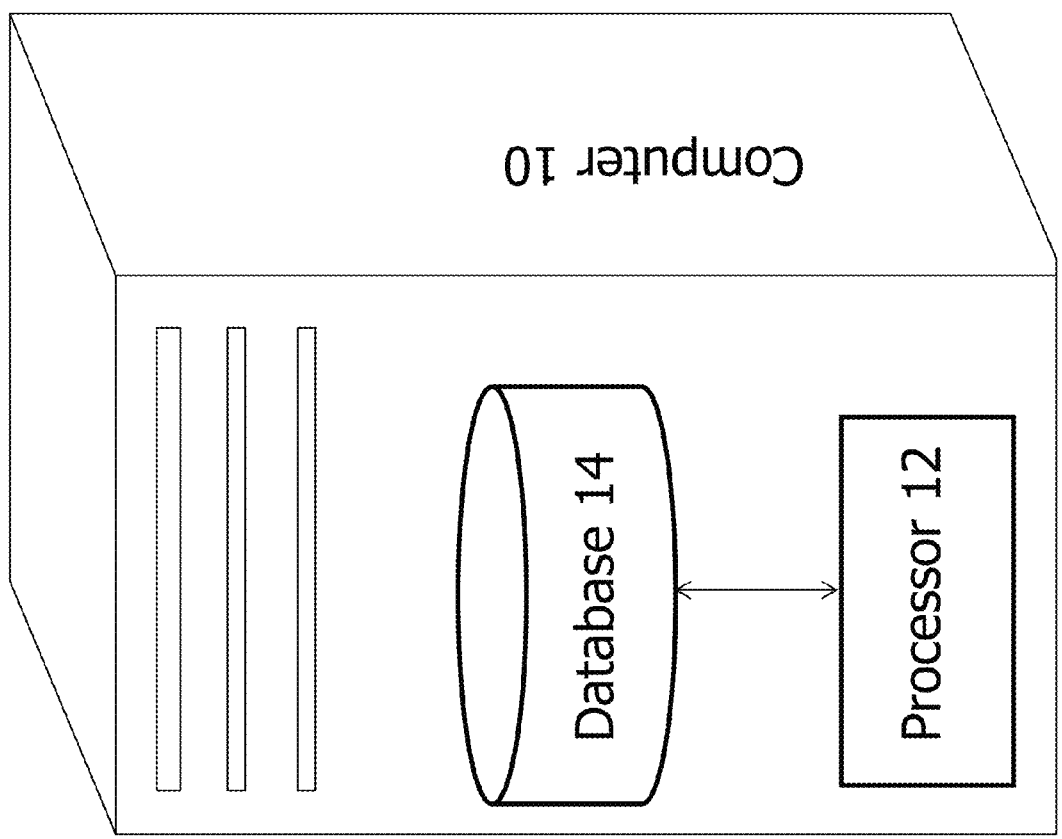
FIG. 1 illustrates an embodiment of an apparatus for generating geometric data that continuously describe a course of a road.

FIG. 1 illustrates an embodiment of an apparatus 10 in the form of a computer or computer system that is configured to generate from a set of road points geometric data describing a continuous course of a road. The apparatus 10 comprises a processor 12 and a database 14 accessible by the processor 12. Moreover, the apparatus 10 comprises a memory (not illustrated) storing program code that controls operation of the processor 12.

While in FIG. 1 the database 14 is illustrated as being an integral component of the apparatus 10, in other embodiments the database 14 may be located remotely from the apparatus 10 and may be accessible by the processor 12 via a network interface. The database 14 stores point data indicative of geographic coordinates of roads. In the following, such point data will also be referred to as road points (sometimes also the term "shape points" is used in the art). In certain implementations, the database 14 may further comprise point data indicative of geographic coordinates of other map objects, such as street addresses and points of interest. The point data may be stored in the database 14 in the Word Geodetic System (WGS) or Universal Transverse Mercator (UTM) format.

The processor 12 is configured to access the database 14 for retrieval of the road points. Moreover, the processor 12 is configured to process the retrieved road points for generation of geometric data that continuously describe a course of a road. The geometric data generated by the processor 12 may again be stored in the database 14 or may be output via a network interface (not shown) to another system.

Figure 2:
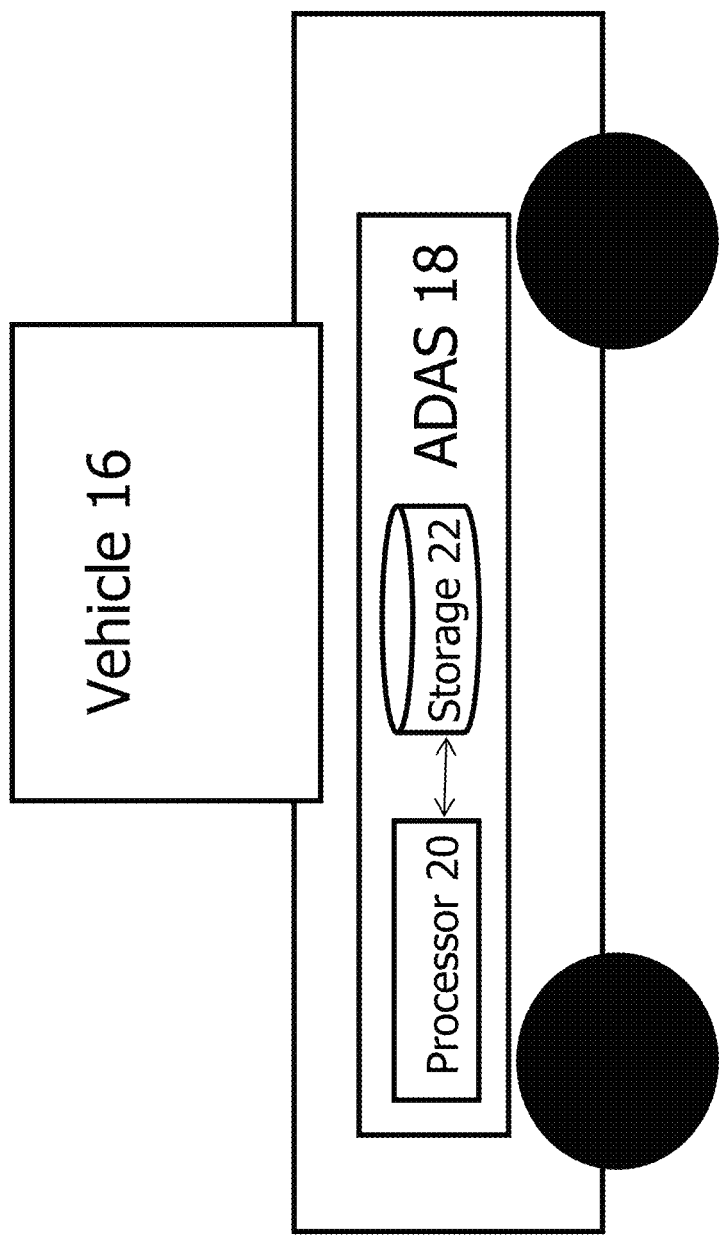
FIG. 2 schematically illustrates an embodiment of a vehicle-based ADAS operating on the geometric data generated by the apparatus in FIG. 1.

The geometric data generated by the processor 12 may, for example, be utilized for navigation or for advanced driver assistance purposes. As an example, FIG. 2 illustrates utilization of the geometric data generated by the processor 12 in a vehicle 16 by an ADAS 18. The ADAS 18 comprises a processor 20 as well as a storage 22 in which the geometric data are stored for access by the processor 20. The processor 20 may implement one or more advanced driver assistance functions based on the geometric data. Such functions may include an adaptive curve light, an adaptive cruise control, and so on. In other configurations, the processor 20 and storage 22 may belong to a vehicle-based or portable navigation device.

The operation of the apparatus 10 illustrated in FIG. 1 will now be described in more detail with reference to flow diagram 300 of FIG. 3. Flow diagram 300 illustrates a method embodiment of generating by the processor 12 from a set of road points stored in database 14 geometric data that continuously describe a course of a road.

In a first step 302, the processor 12 determines, from subsets of two or more road points retrieved from the database 14, a sequence of two or more primary base elements. The sequence of primary base elements may be "loose" in that the transition from one primary base element to the adjacent primary base element can be discontinuous with respect to one or more of position, gradient and curvature. Since the determination of the sequence of primary base elements need not consider any continuity constraints, step 302 is mathematically robust and permits to reliably determine a specific primary base element for each possible sub-set of road points.

An individual primary base element may be determined for each sub-set of two, three, four or more road points. The primary base element may generally be a linear element such as a line, a line segment, a circle, a circular arc or a clothoid, including any approximations thereof. In certain configurations there may be a constraint which defines that only primary base elements of a certain kind (e.g., circles) may be determined. In other configurations, the constraint may specify that the determination in step 302 is restricted to a specific set of two or more kinds of primary base elements (e.g., lines and circles). The primary base elements determined in step 302 may have a dedicated length (such as line segments and circular arcs) or not (such as lines and circles).

Once a sequence of two or more primary base elements has been determined in step 302, the processor 12 proceeds to step 304 and determines one or more secondary base elements interconnecting adjacent primary base elements. While the primary base elements have directly been determined based on road points, the secondary base elements may be "secondary" in that they have been determined from primary base elements (and thus "indirectly" from road points).

In a similar manner as the primary base elements, the secondary base elements may be linear geometric elements such as lines, line segments, circles, circular arcs, clothoids, and so on, including any approximations thereof. The adjacent primary base elements for which an interconnecting secondary base element are determined in step 304 may keep their position as determined in step 302 or may change at least one of position and orientation in step 304.

In the following, the determination of a (single) interconnecting secondary base element for two adjacent primary base elements of the sequence determined in step 302 will be described in more detail. In case the sequence determined in step 302 comprises more than two primary base elements, multiple secondary base elements may of course be determined in step 304.

The processor 12 is configured to determine the interconnecting secondary base element in step 304 such that the secondary base element continuously connects to and at a connection point has the same gradient as each of the two interconnected primary base elements. In other words, step 304 will result in a sequence of three base elements, including a first primary base element which at a connection point is connected to a secondary base element, wherein the secondary base element at another connection point is connected to a second primary base element.

The presence of connection points implies that there exists a positional continuity from the first primary base element via the interconnecting secondary base element to the second primary base element. Additionally, the interconnecting secondary base element is selected such that at its connection points to the first primary base element and the second primary base element there exists also continuity in gradient. In general there may, however, still exist discontinuity in curvature at the two connection points.

After one or multiple interconnecting secondary base elements have been determined by the processor in step 304, the processor 12 proceeds to step 306 and determines for an individual primary base element and an individual secondary base element adjacent to the primary base element an interconnecting transition curve. The interconnecting transition curve is determined such that it continuously connects to both, the primary base element and the secondary base element. In other words, there will be positional continuity between each of the primary base element and the transition curve as well as the transition curve and the secondary base element. The transition curve is additionally determined such that it has at its connection point to the primary base element the same gradient and also the same curvature as the primary base element, and the same applies to its connection point to the secondary base element.

The transition curve determined in step 306 may be any linear geometric element that may be connected to adjacent primary and secondary base elements with continuity in curvature. As an example, the transition curve may be a clothoid, a sine wave, a parabola, and so on, including any approximations thereof.

Step 306 results in at least one sequence of a primary base element, a transition curve and a secondary base element, that is continuous with respect to position, gradient and curvature. Additionally, the course of the road is typically approximated very well as the original position of the primary base element(s) will in most cases not be changed or be changed only slightly (e.g., by a marginal shift compared to an overall length of the base element(s)).

It will be appreciated that in case a sequence of three or more primary base elements is determined in step 302, step 304 can be performed with respect to every pair of adjacent primary base elements. Moreover, in case multiple secondary base elements are determined in step 304 for multiple pairs of adjacent primary base elements, step 306 can be performed for any pair including a primary base element and an adjacent secondary base element so as to determine multiple interconnecting transition curves. In general, for a sequence of n primary elements, up to (n−1) secondary base elements and (n−1)*2 transition curves may be determined.

The processor 12 then determines in step 308 geometric data that continuously describe a course of the road based on the primary base element determined in step 302, the one or more secondary base elements determined in step 304 as well as the one or more transition curves determined in step 306. In the above example, the geometric data may comprise the data of n primary elements, up to (n−1) secondary base elements and up to (n−1)*2 transition curves plus any supplemental data as needed. The geometric data may be specified in terms of geographic coordinates.

The geometric data determined in step 308 by the processor 12 may thus comprise geographic data indicative of a sequence of linear base elements of dedicated lengths that are connected end-to-end, wherein two adjacent base elements have the same gradient and the same curvature at their connection point. Such geometric data continuously (with respect to position, gradient and curvature) describe a course of the road and may be used in the ADAS 18 illustrated in FIG. 2 or in any navigation device.

The geometric data determined in step 308 may be stored by the processor 12 in the database 14 or any other storage. Moreover, the geometric data thus determined may be cloned into the storage 22 of the ADAS 18 or the storage of a navigation device.

It should be noted that the primary base elements and the secondary base elements from which the geometric data are determined in step 308 will typically not be the same primary base elements and secondary base elements determined in steps 302 and 304, respectively. Rather, the processor 12 may, for example, truncate or "shorten" the primary base elements and the secondary base elements as secondary base elements are inserted in the sequence of primary base elements in step 304 and as transition curves are inserted in the alternating sequence of primary and secondary base elements in step 306. Additionally, one or more of translatory shifting and rotation operations and radius variations may have been impressed on one or more of the primary base elements determined in step 302, the secondary base elements determined in step 304 and the transition curves determined in step 306 (e.g., in intermediate steps not illustrated in FIG. 3).

In the following, a more detailed method embodiment of generating geometric data that continuously describe a course of a road will be described with reference to FIGS. 4 to 13. This method embodiment may be performed by the apparatus 10 of FIG. 1 in connection with the generic sequence of steps 302 to 308 illustrated in FIG. 3, and for this reason reference will repeatedly be made to FIG. 3. The following method embodiment is, however, not restricted to be necessarily performed by the apparatus 10 and in the context of the method embodiment of FIG. 3.

Figure 4:
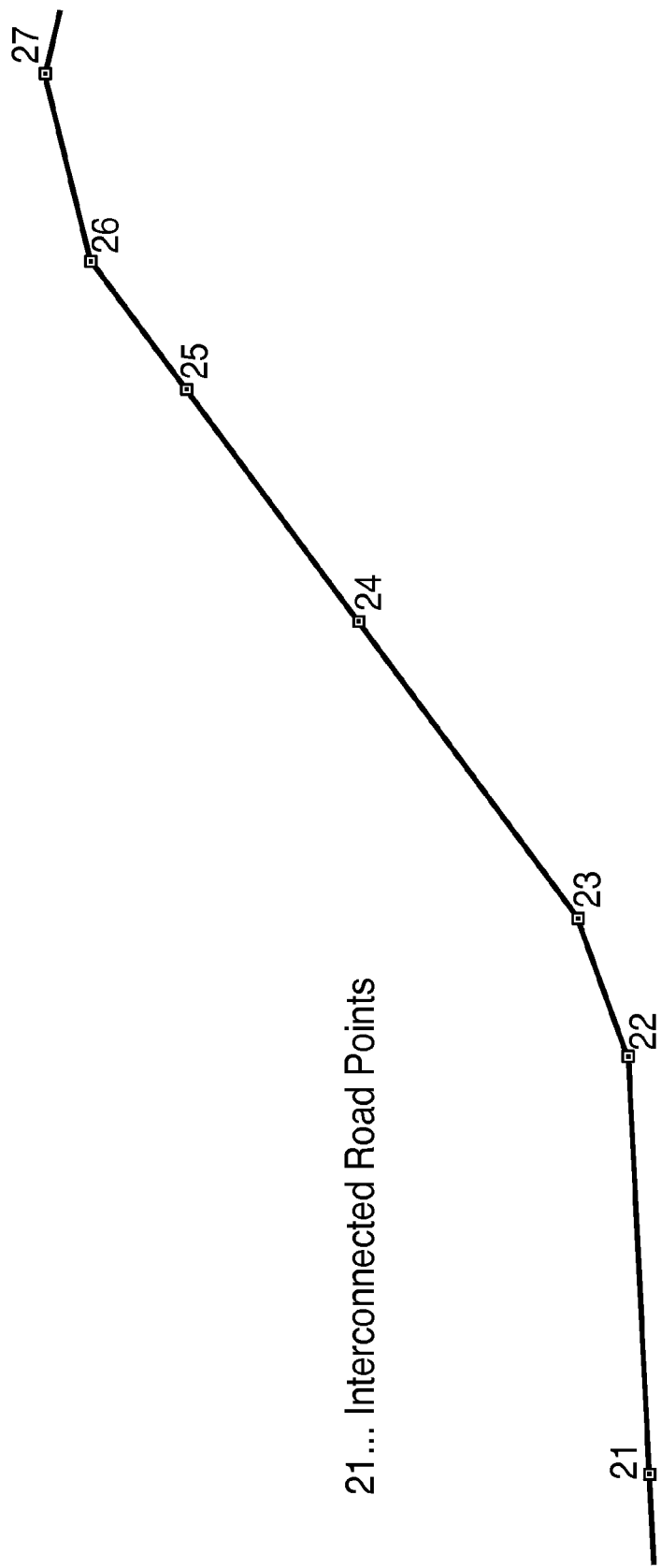
FIG. 4 is a schematic diagram illustrating a sequence of interconnected road points.

FIG. 4 illustrates a sequence of road points denoted 21 to 27. The road point sequence is stored in the database 14 in the form of planar UTM coordinates. It should be noted that the planar UTM coordinates may have been obtained from spherical WGS coordinates. In a similar manner, the geometric data that will be generated from the planar UTM coordinates as described herein may be transformed back into WGS coordinates.

In FIG. 4 each pair of adjacent road points is interconnected by a line segment to approximate the course of the road. As will be appreciated, there exists discontinuity with respect to gradient and curvature between adjacent line segments in FIG. 4. As such, the line segment approximation in FIG. 4 is in many cases not suitable for sophisticated navigation or advanced driver assistance functions.

Figure 3:
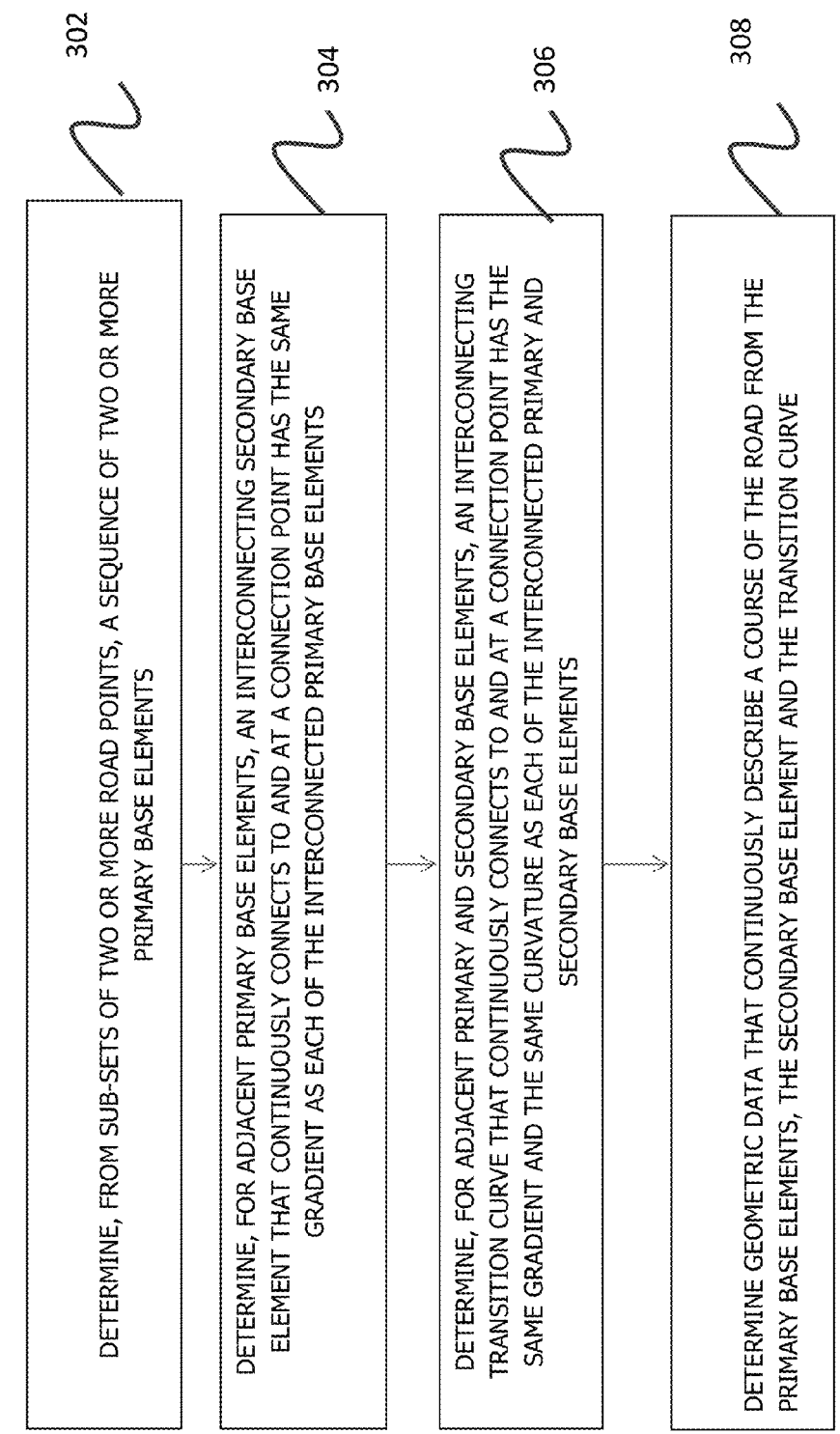
FIG. 3 shows a flow diagram illustrating a method embodiment of operating the apparatus of FIG. 1.
Figure 5:
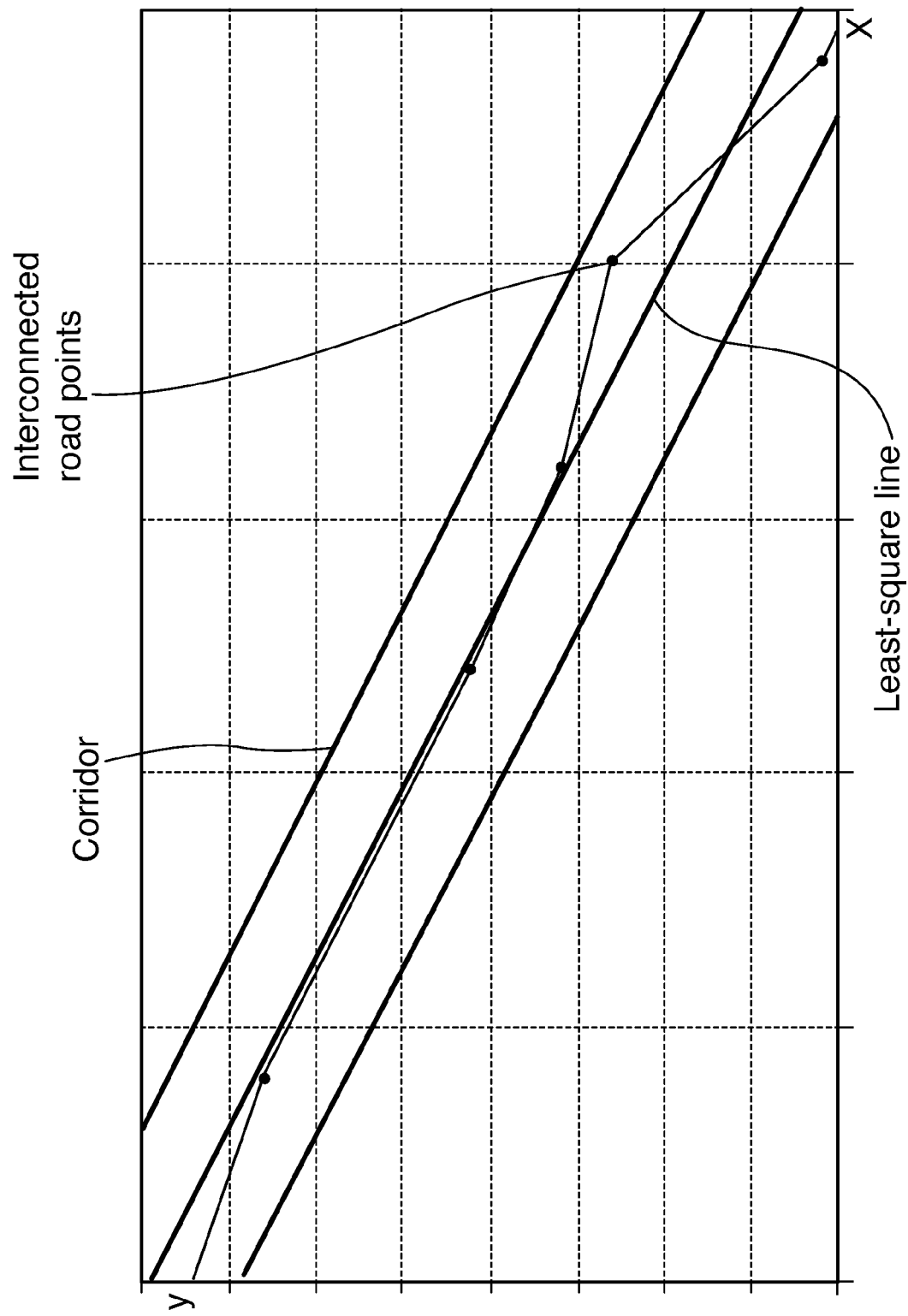
FIG. 5 is a schematic diagram illustrating the provision of a corridor for a set of interconnected road points.

Using the road points as illustrated in FIG. 4 as input parameters, the processor 12 initially determines a sequence of primary base elements based on individual sub-sets of road points (see step 302 in FIG. 3). FIG. 5 schematically illustrates the determination of a primary base element in the form of a line (or line segment) for an exemplary sub-set of five or more road points. The line illustrated in FIG. 5 is a least-square line, which means that the line is placed such that the sum of the squares of the distances between the road points and the line is minimized. In general, a least-square line can be derived from at least three road points, while for a simple line two road points will suffice. The processor 12 may generally evaluate both simple lines and least-square lines as possible candidates for primary base elements.

As an optional constraint illustrated in FIG. 5, all road points must lie within a predefined corridor defined by two parallel lines positioned at opposite sides of the least-square line at the same distance (of, e.g., 1 m) from the least-square line. That is, an additional road point will not be considered for an individual primary base element (i.e., will not be included in its associated sub-set of road points) if that road point would lie outside the corridor.

In general, the quality of the least-square line shown in FIG. 5 increases as the sum of the squares of the distances increases and as more road points can be accommodated within the predefined corridor. By defining a quality measure based on the sum of the squares of the distances and on the number of road points considered for the least-square line for a given corridor width, and by defining an abortion criterion based thereon, a one or more least-square lines can be determined for the road point scenario illustrated in FIG. 4 in addition to the simple lines shown in FIG. 4. Each of the resulting simple and least-square lines is a primary base element.

In addition to determining least-square lines as primary base elements, one or more least-square circles are determined as primary base elements. The determination of least-square circles follows the determination of least-square lines as schematically illustrated in FIG. 5. That is, a corridor is defined around a least-square circle and a quality measure for the least-square circle is defined. Again, the quality increases as the sum of the squares of the distances decreases and as more road points can be considered for an individual least-square circle. In general, four or more road points are considered for each least-square circle.

Once a set primary base elements comprising simples lines, least-square lines and least-square circles has been determined for a given sequence of road points, a selection takes place to determine whether a simple line, a least-square line or a least-square circle would better locally approximate the course of the road for the sequence of road points. The selection thus identifies a single primary base element (simple line, least-square line or least-square circle) that is to be used for the purposes of the following processing step (i.e., determination of secondary base elements in step 304 of FIG. 3).

The selection may take into account the quality measure associated with each simple line (if any) each least-square line and each least-square circle. The selection also defines the length of an individual simple line (line segment), least-square line (line segment) or least-square circle (circular arc) that is selected as a primary base element for the following processing step. The length may generally be selected such that two adjacent primary base elements have an at least small overlap or intersect (as gaps between two adjacent primary base elements are not always easy to close). The filtering may additionally take into account that in order to be, the corresponding primary base element should have a certain minimum length (e.g., with respect to its adjacent primary base elements).

Figure 6:
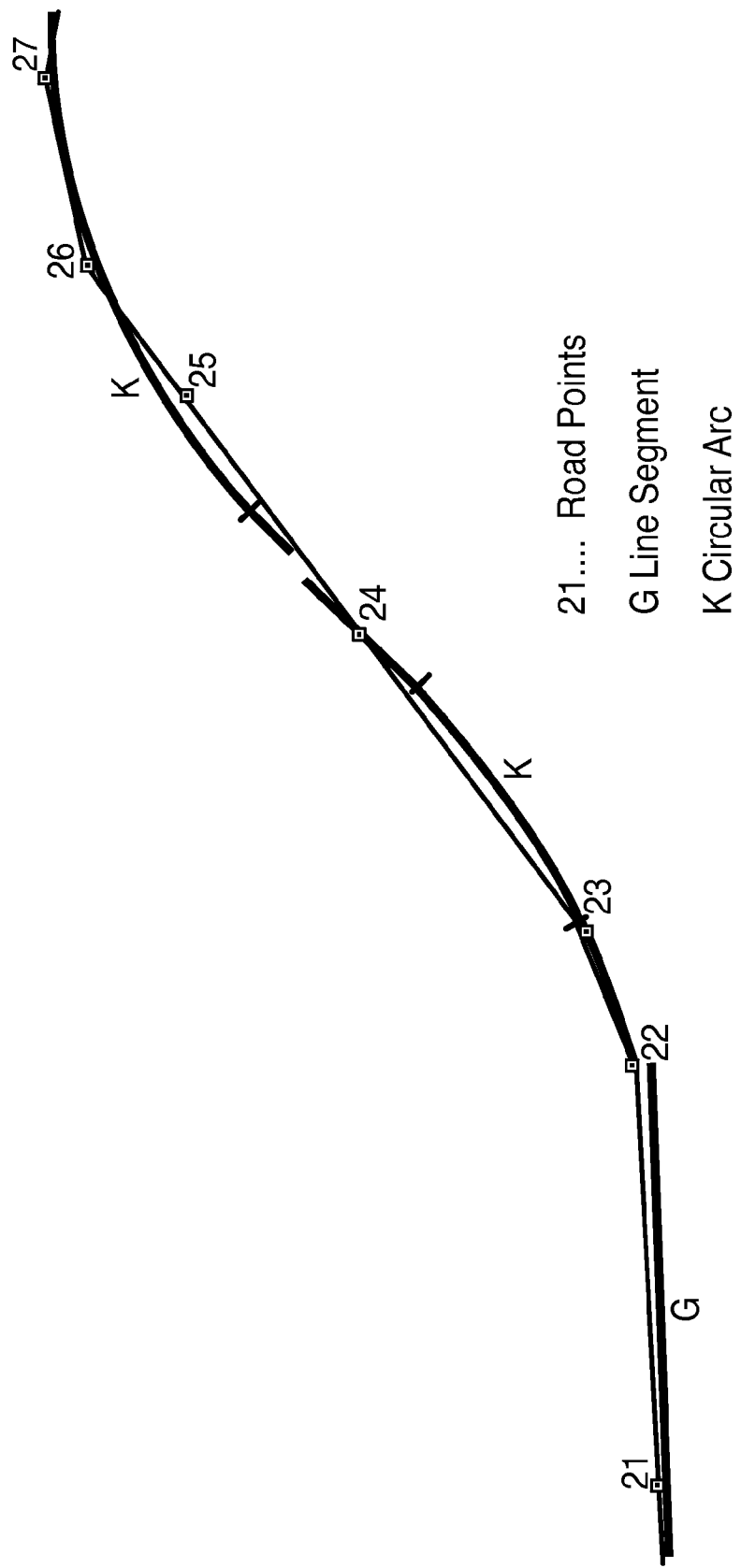
FIG. 6 is a schematic diagram illustrating a sequence of primary base elements for individual sub-sets of road points.

FIG. 6 illustrates possible results of a plurality of selection procedures for the road point scenario of FIG. 4. As illustrated in FIG. 6, a line segment (from a least-square line) is determined as the primary base element for road point 21 and its preceding road point(s). A circular arc is selected as primary base element for road points 22, 23 and 24. Another circular arc is selected as primary base elements for road points 25, 26 and 27.

Figure 7:
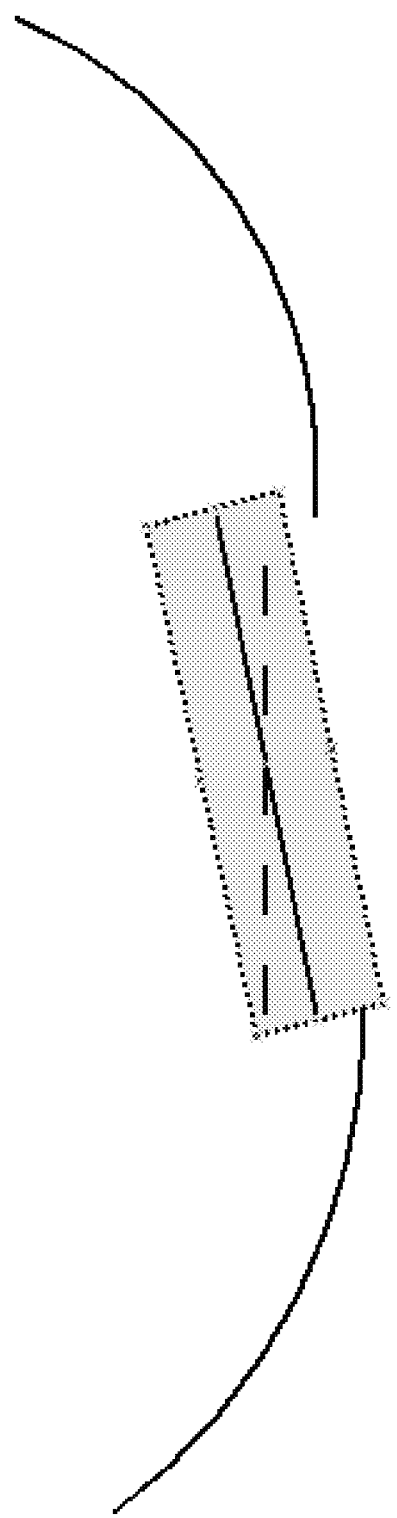
FIG. 7 is a schematic diagram illustrating the processing of a primary base element.

In certain scenarios the primary base elements thus determined might need to be adjusted in order to compensate a non-realistic course of a road (e.g., due to erroneous road points or mathematical artifacts in the determination of the primary base elements). FIG. 7 illustrates such an adjustment for an oblique line segment located between two circular arcs. In general, the adjustment aims at reducing a discontinuity in gradient between the ends of two adjacent primary base elements (while accepting a positional discontinuity and a discontinuity in gradient). In the exemplary scenario illustrated in FIG. 7, the oblique primary base element will thus be slightly rotated such that the gradient of the rotated primary base element (dashed line) better matches the gradient of the two neighboring primary base elements at their ends facing the rotated primary base element.

While FIG. 7 illustrates a rotation of a primary base element, in other scenarios a shift (e.g., a parallel shift) or a change of a radius might be applied so as to ensure that two adjacent primary base elements have an at least approximately similar gradient at their ends facing each other.

Once the sequence of primary base elements has been determined and, if necessary, adjusted, the processor 12 determines for each pair of adjacent primary base elements an interconnecting secondary base element that establishes positional continuity as well as continuity in gradient (see step 304 in FIG. 3). It should be noted that in some cases the determination of a secondary base element may be omitted. Such cases may include the situation in which two adjacent primary base elements already intersect at a connection point and, at the connection point, have the same or almost the same gradient. In most cases, however, two adjacent primary base element of the primary base element sequence will either not intersect or will have substantially different gradients at their ends facing each other, so that an interconnecting secondary base element needs to be determined.

In general, the interconnecting secondary base element is determined as a line/line segment or circle/circular arc that smoothly fits between the two adjacent primary base elements. As such, the length of the original primary base elements will be reduced upon inserting an interconnecting secondary base element therebetween.

Figure 8A:
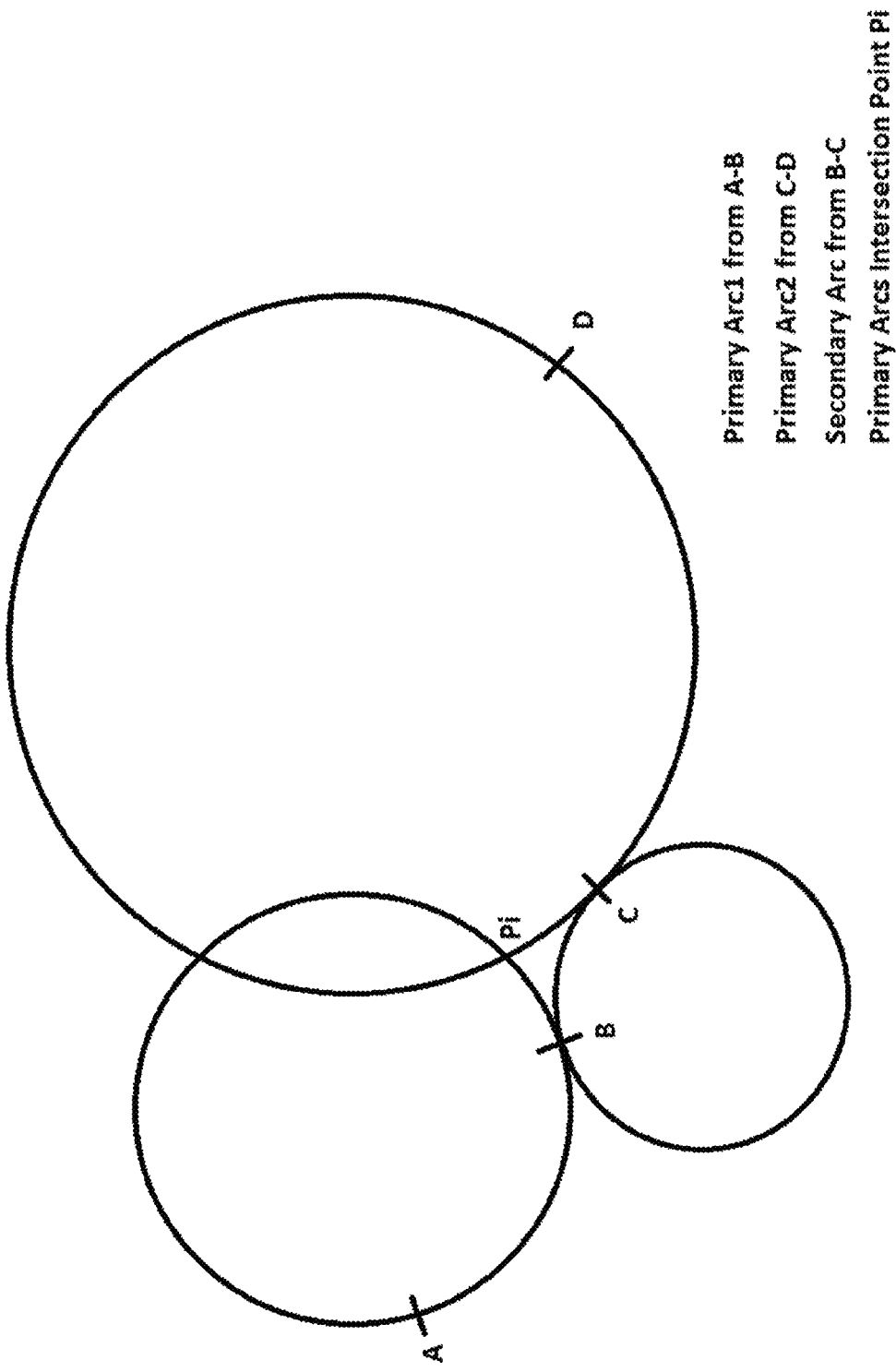
FIGS. 8A, 8B are schematic diagrams illustrating examples of the determination of a secondary base element from two adjacent primary base elements.

FIGS. 8A and B exemplarily illustrate determination of an interconnecting circular arc (comprising points B and C that will generally not coincide with road points) as a secondary base element between two adjacent circular arcs (comprising points A and B as well as C and D, respectively, that will also generally not coincide with road points) that constitute the primary base elements. As stated above, the location of the center point and radius of the "secondary" circular arc are selected such that it continuously connects to and at the corresponding connection points B and C has at least substantially the same gradient as each of the two interconnected "primary" circular arcs. After the secondary base element has been determined, the (sum of) lengths of the three arcs is defined for the subsequent processing operation by the pairs of points A and B, B and C, as well as C and D, respectively. This implies that the primary base elements have to be truncated in order to fit in the secondary base element.

Figure 8B:
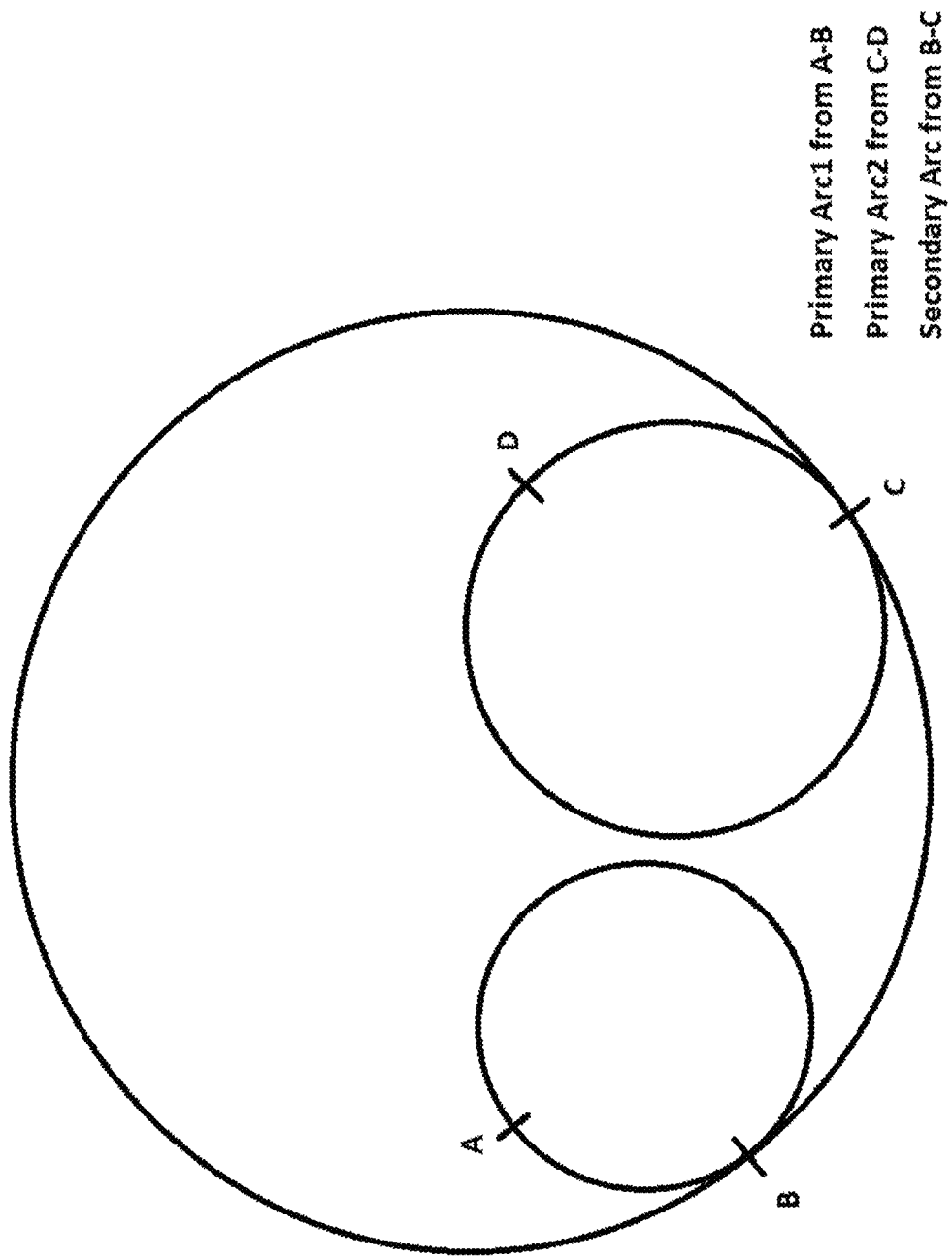

FIG. 8A illustrates the case where the two primary base elements intersect at point Pi. Here, the radius of the "auxiliary circle" that defines the secondary base element that is to be fit in may be defined a priori (e.g., based on a corridor width as generally illustrated in FIG. 5). The center of the auxiliary circle may be defined based on point Pi (i.e., the intersection of the two primary base elements). FIG. 8B illustrates the case where the two primary base elements have no point of intersection. Here, the radius of the auxiliary circle may again be define a priori (based on a corridor width estimated for a line) The center of the auxiliary circle may be defined by enlarging the radius of each of the two primary base elements until one or two points of intersection result.

While FIGS. 8A and B illustrate the determination of a secondary base element in the form of a circle or a circular arc, in other situations, and depending on the kinds of primary base elements to be interconnected, a line or line segment might be a better choice. Therefore, a decision mechanism may be implemented to select a particular kind of secondary base element that is to interconnect a given pair of adjacent primary base elements. It should be noted that the primary base elements might still slightly be adjusted (e.g., shifted, rotated or varied in radius) in order to facilitate determination of an interconnecting secondary base element.

Figure 9:
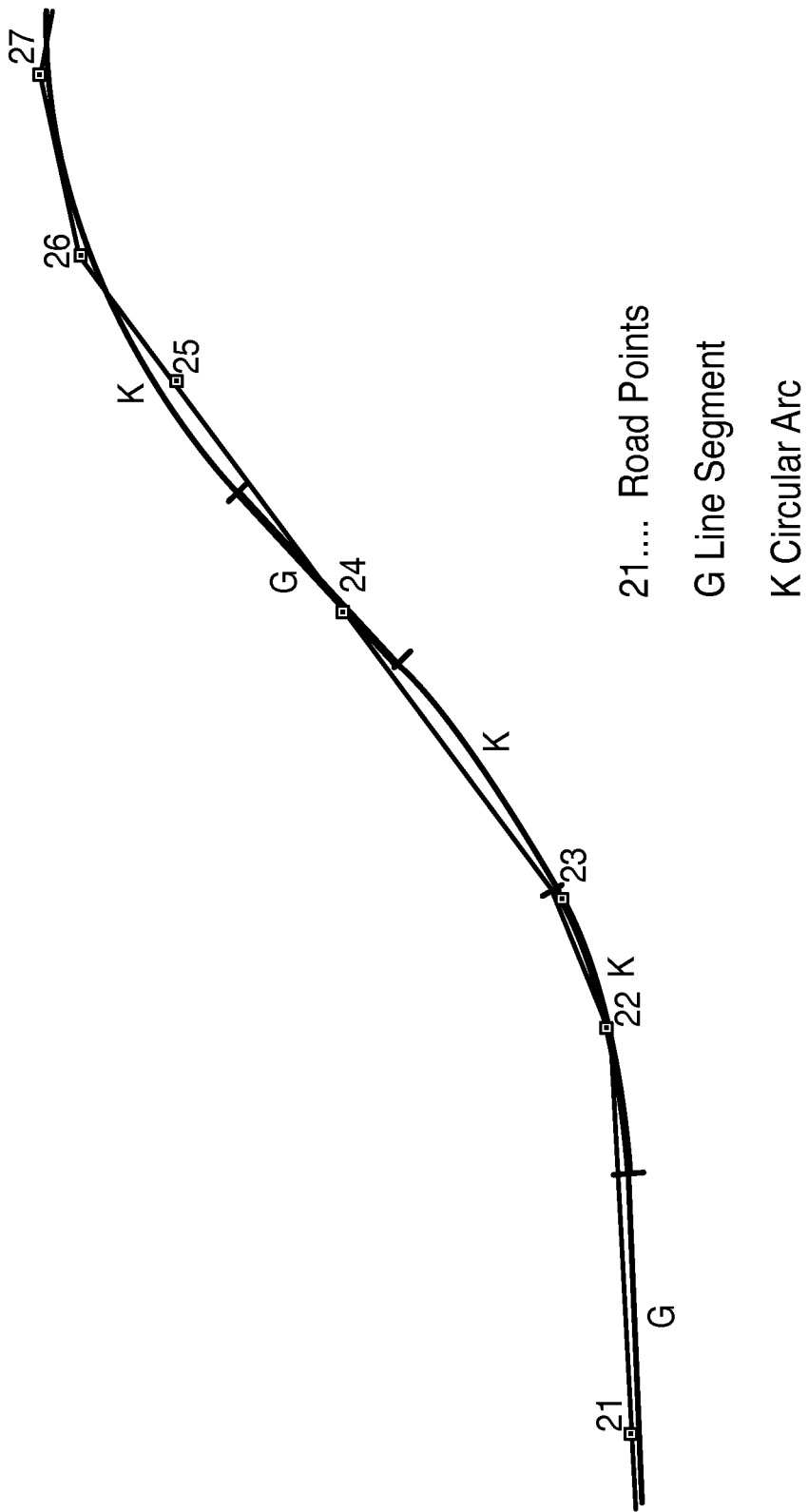
FIG. 9 is a schematic diagram illustrating a sequence of primary and secondary base elements.

FIG. 9 illustrates for the sequence of primary base elements illustrated in FIG. 6 the determination of interconnecting secondary base elements that continuously connect to and at their connection points have the same gradients as their adjacent primary base elements. As shown in FIG. 9, a circular arc is determined as secondary base element between the line segment associated with road point 21 and the circular arc associated with road point 23. In a similar manner, a line segment is determined as interconnecting secondary base element for the circular arc associated with road points 23 and the circular arc associated with road point 25.

Figure 10:
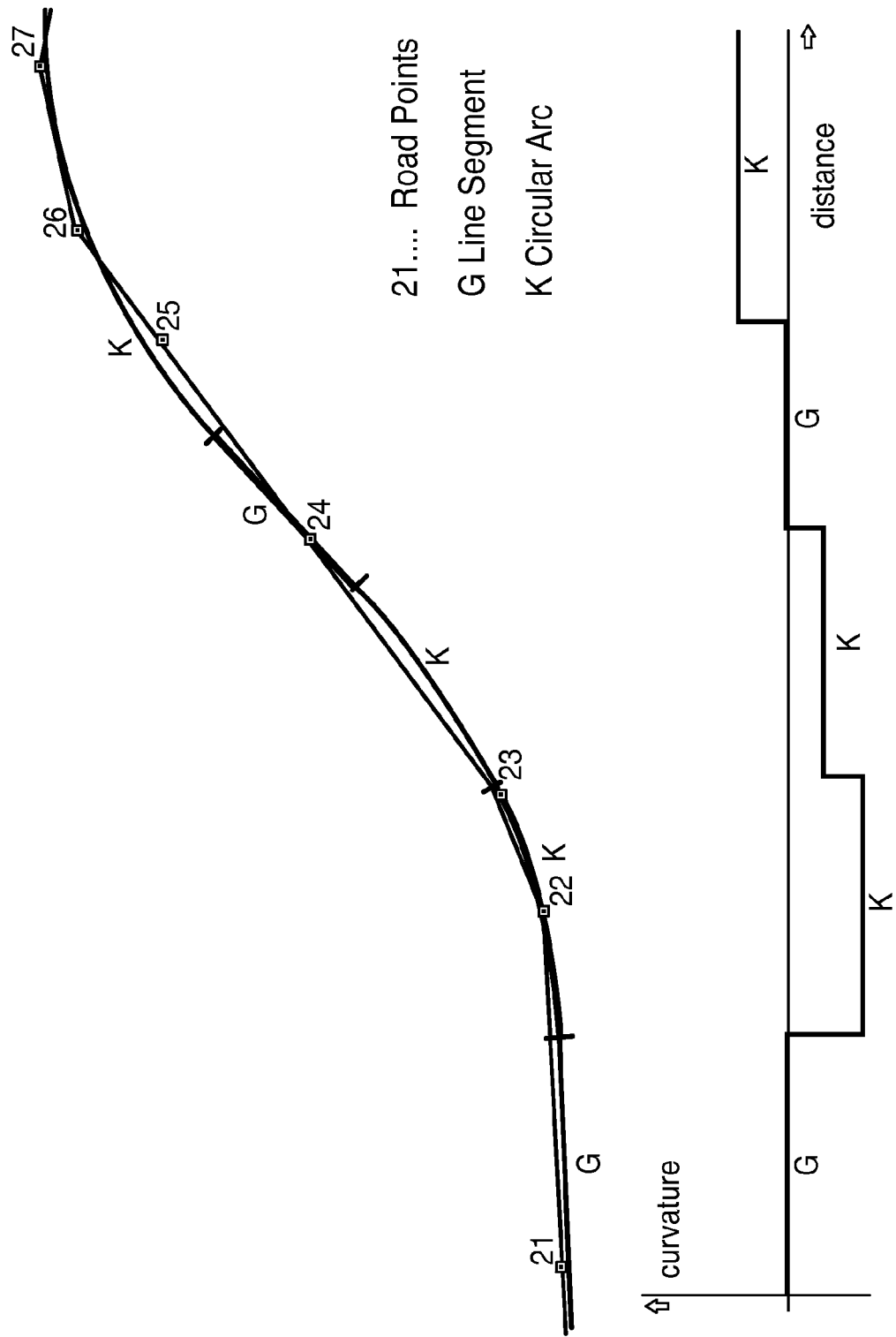
FIG. 10 is a schematic diagram illustrating a curvature diagram for the sequence of primary or secondary base elements of FIG. 9.

FIG. 10 illustrates a curvature diagram for the sequence of primary and secondary base elements of FIG. 9. As becomes apparent from this curvature diagram there still exits a discontinuity in curvature between each pair of adjacent primary and secondary base elements.

To remove the discontinuity in curvature, the processor 12 in a next step determines an interconnecting transition curve between each pair of adjacent primary and secondary base elements. The transition curve is selected such that it continuously connects to and at its connection points has the same gradient and the same curvature as the interconnected primary and secondary base elements (see step 306 in FIG. 3).

Figure 11:
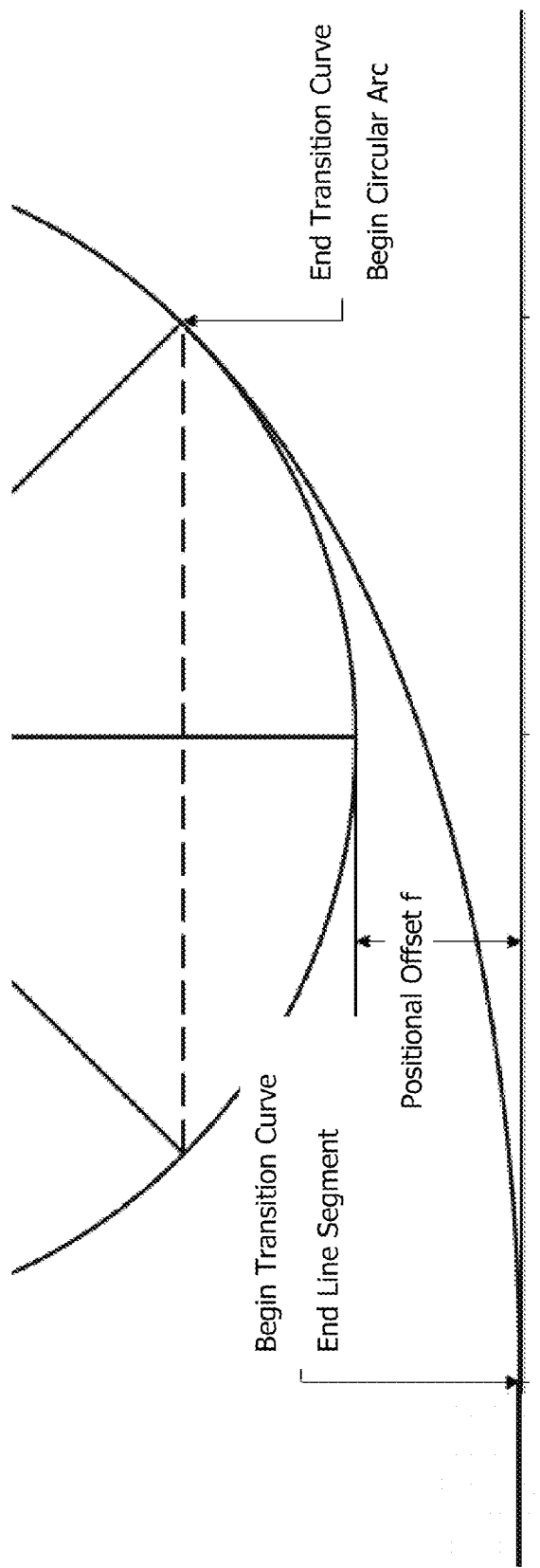
FIG. 11 is a schematic diagram illustrating the determination of an interconnecting transition curve for adjacent primary and secondary base elements.

The diagram of FIG. 11 schematically illustrates the determination of a transition curve in the form of a clothoid between a line segment and a circular arc. For this purpose in a first step the positional discontinuity between the line segment and the arc that was established previously is intentionally given up by slightly shifting one or both of the line segment and the circular arc as to achieve a positional offset f therebetween. The positional offset f is typically selected so as to not exceed approximately 20 or 30 cm. As such, the positional offset is negligible in terms of a real-world application such as a navigation device or the ADAS 18.

Depending on the positional offset f, clothoids of different lengths may be inserted between the line segment and the circular arc in the exemplary scenario of FIG. 11. Generally, the positional offset f may be selected such that a desired length of the interconnecting transition curve results, wherein the desired length of the transition curve depends on the length of the line segment and the circular arc to be connected in the particular scenario of FIG. 11.

In an exemplary scenario the length Lc of the clothoid may be determined in accordance with Lc=0.33*min(L1, L2), wherein L1 and L2 are the lengths of the primary base element and the secondary base element, respectively, that are to be connected by the clothoid. In a next step, the positional offset may be determined according to f=(Lc*Lc)/24*dC), wherein dC is the difference in curvature between the primary base element and the secondary base element. In case of a transition from a circle or circular arc to a line or line segment, dC=1/R, with R being the radius of the circle or circular arc. In the case of a transition from a circle or circular arc with radius R1 to a circle or circular arc with radius R2, dC=1/R2−1/R1. As an example, in the case of clothoid of length 100 m that is to be inserted between a line segment and a circular arc of R=1000 m, a positional offset f of 0.42 m results. In general, the positional offset will be below 1 m and typically below 0.5 m.

Figure 12:
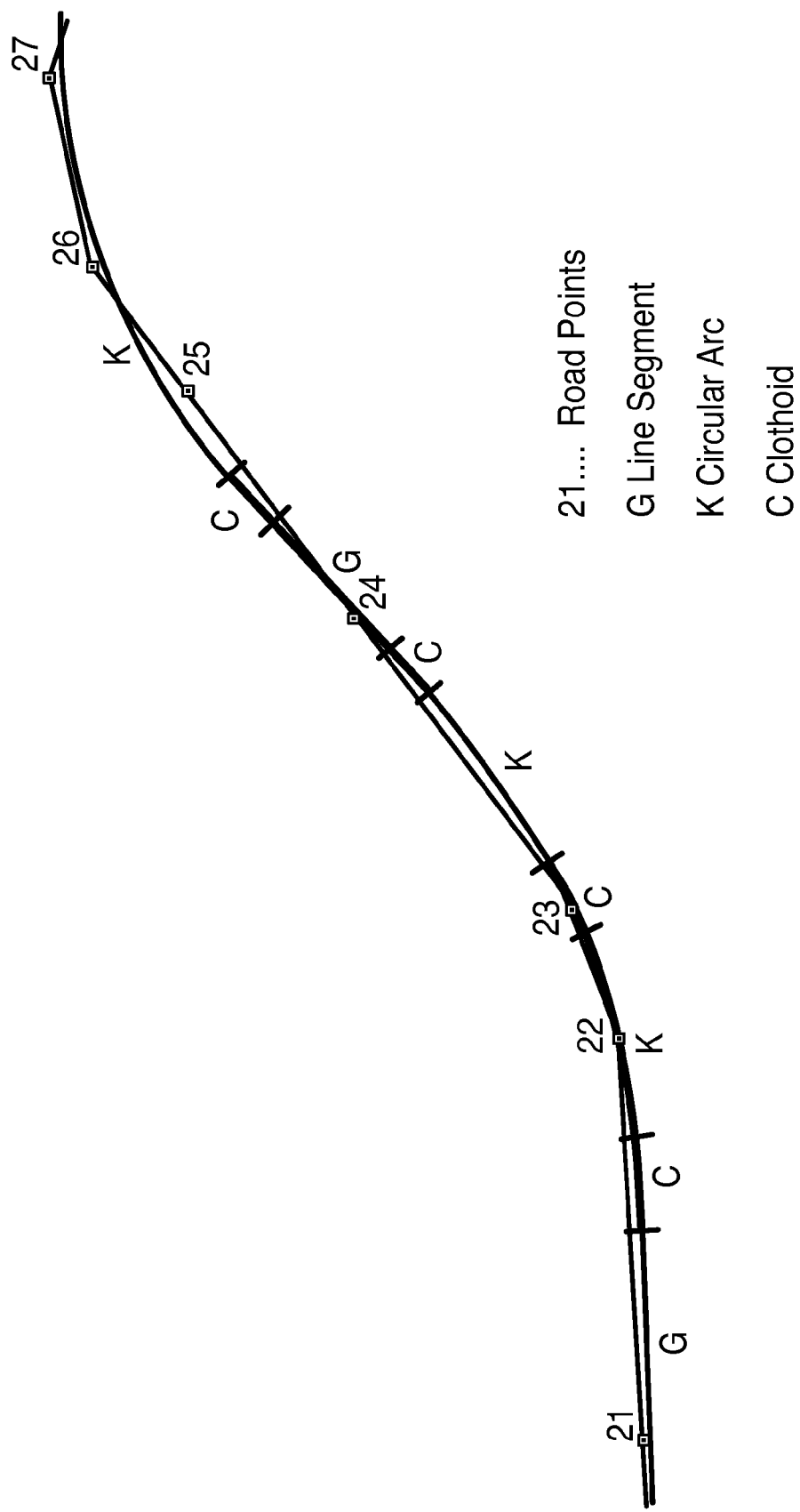
FIG. 12 is a schematic diagram illustrating a sequence of primary base elements, secondary base elements and transition curves.
Figure 13:
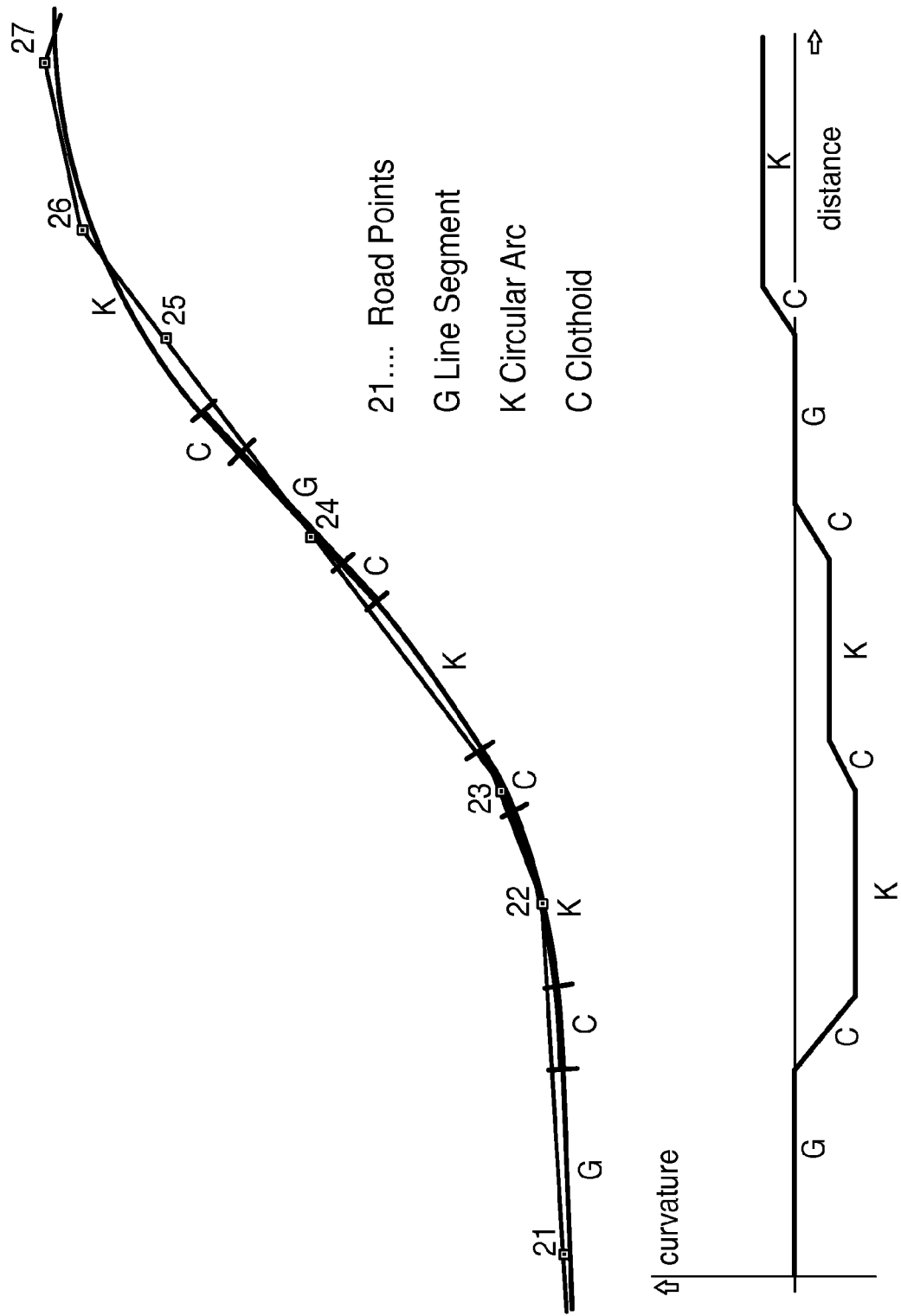
FIG. 13 is a schematic diagram illustrating a curvature diagram for the sequence of primary base elements, secondary base elements and transition curves of FIG. 12.

FIG. 12 schematically illustrates for the exemplary sequence of primary and secondary base elements of FIG. 9 the insertion of interconnecting clothoids between each pair of primary and secondary base elements. As becomes apparent from the associated curvature diagram of FIG. 13, the interconnecting clothoids ensure a continuity in curvature between each base element pair. The individual geometric elements illustrated in FIG. 13 continuously describe the course of the road that is defined by the discontinuous road points illustrated in FIG. 4. For this reason, the geometric data of the geometric elements illustrated in FIG. 13 can be used (e.g., in a WGS format) for the purposes of a navigation device or the ADAS 18, or for any other purposes (see step 308 in FIG. 3). It will be appreciated that for arriving at the geometric elements illustrated in FIG. 13, the originally determined primary and secondary base elements may need to be adjusted (e.g., by one or more of a parallel shift, a rotation, a variation in radius and a truncation) as needed.

As has become apparent from the above description of exemplary embodiments, the technique presented herein permits the determination of geometric data that continuously describe a course of a road. The geometric data can be obtained in a mathematically robust manner as no hard constraints are imposed on the generation of the primary base elements. Moreover, the determination of the secondary base elements based on the previously determined primary base elements is likewise not associated with much mathematical overhead. The same applies to the determination of the interconnecting transition curve once the secondary base elements have been determined. Therefore, the technique presented herein is not only mathematically robust, but also fast.

While the technique presented herein has been described with respect to particular embodiments, those skilled in the art will recognize that the present invention is not limited to the specific embodiments described and illustrated herein. It is to be understood that this disclosure is only illustrative. Accordingly, it is intended that the present invention be limited only by the scope of the claims appended hereto.

The invention claimed is:

1. A method of generating from a point set geometric data that continuously describe a course of a geographic object, the method comprising:
   determining by a processor, from sub-sets of two or more points, a sequence of two or more primary base elements;
   determining, by the processor, for adjacent primary base elements, an interconnecting secondary base element that continuously connects to and at a connection point has the same gradient as each of the interconnected primary base element;
   determining, by the processor, for adjacent primary and secondary base elements, an interconnecting transition curve that continuously connects to and at a connection point has the same gradient and the same curvature as each of the interconnected primary and secondary base element;
   determining, by the processor, geometric data that continuously describe a course of the geographic object from the primary base elements, the secondary base element and the transition curve; and
   generating a database from the geometric data, including storing the determined geometric data in a storage device, for use in the operation of a navigation device.

2. The method of claim 1, wherein determining the interconnecting transition curve comprises:
   manipulating at least one of the adjacent primary and secondary base elements so as to realize a positional offset between the adjacent primary and secondary base elements at their connection point; and
   bridging the positional offset by the interconnecting transition curve.

3. The method of claim 2, wherein manipulating at least one of the adjacent primary and secondary base elements comprises impressing a shift on at least one of the adjacent primary and secondary base elements.

4. The method of claim 2, wherein the positional offset is defined by a selected length of the transition curve.

5. The method of claim 4, wherein the length of the transition curve is selected dependent on a length of at least one of the interconnected primary and secondary base elements.

6. The method of claim 1, wherein the transition curve is selected from a transition curve set comprising a clothoid, a sine wave and a parabola.

7. The method of claim 1, wherein the primary and secondary base elements are selected from a base element set comprising a line, a line segment, a circle and a circular arc.

8. The method of claim 1, wherein determining the primary base elements comprises interpolating individual sub-sets of road points.

9. The method of claim 1, wherein determining an individual primary base element comprises defining a corridor around an individual sub-set of road points.

10. The method of claim 1, wherein determining the interconnecting secondary base element comprises:
    determining a point of intersection between the adjacent primary base elements; and
    calculating the interconnecting secondary base element based on the point of intersection.

11. The method of claim 1, further comprising:
    using contents of the database to operate an advanced driver assist system.

12. The method of claim 1, further comprising:
    using contents of the database to operate a navigation system.

13. A non-transitory computer-readable medium comprising program code that when executed on a computing device performs the method comprising:
    determining, from sub-sets of two or more points, a sequence of two or more primary base elements;
    determining, for adjacent primary base elements, an interconnecting secondary base element that continuously connects to and at a connection point and has the same gradient as each of the interconnected primary base elements;

determining, for adjacent primary and secondary base elements, an interconnecting transition curve that continuously connects to and at a connection point and has the same gradient and the same curvature as each of the interconnected primary and secondary base elements;

determining geometric data that continuously describe a course of the geographic object from the primary base elements, the secondary base element and the transition curve; and generating a database from the geometric data, including storing the determined geometric data in a storage device, for use in the operation of a navigation device.

14. An apparatus for generating from a point set geometric data that continuously describe a course of a geographic object, the apparatus comprising:

a processor configured:

to determine from sub-sets of two or more points, a sequence of primary base elements;

to determine for adjacent primary base elements, an interconnecting secondary base element that continuously connects to and at connection points has the same gradient as each of the interconnected primary base elements;

to determine for adjacent primary and secondary base elements, an interconnecting transition curve that continuously connects to and at connection points has the same gradient and the same curvature as each of the interconnected primary and secondary base element;

to determine geometric data that continuously describe a course of the geographic object from the primary base elements, the secondary base element and the transition curve; and to generate a database from the geometric data, including storing the determined geometric data in a storage device, for use in the operation of a navigation device.

* * * * *